T. E. MURRAY.
METHOD OF ELECTRICALLY WELDING TOGETHER THE EDGES OF THIN METAL PLATES.
APPLICATION FILED JULY 3, 1920.
1,363,156.                                              Patented Dec. 21, 1920.
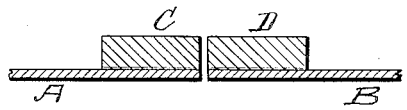
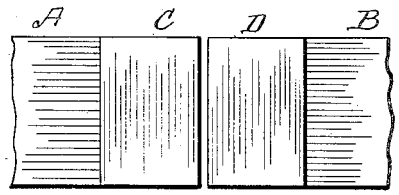
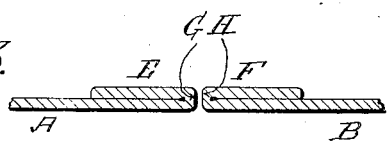
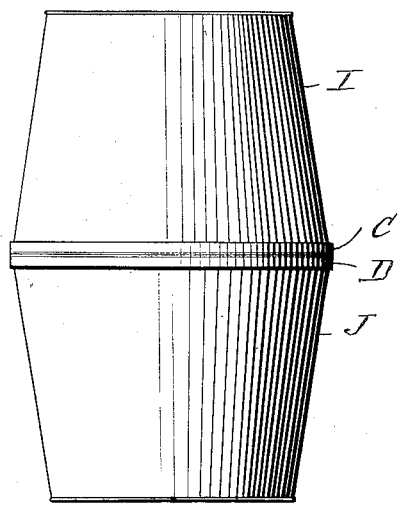
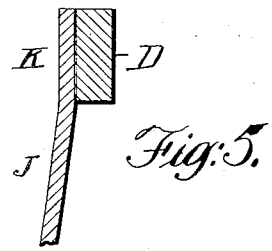

UNITED STATES PATENT OFFICE.

THOMAS E. MURRAY, OF BROOKLYN, NEW YORK.

METHOD OF ELECTRICALLY WELDING TOGETHER THE EDGES OF THIN METAL PLATES.

1,363,156.    Specification of Letters Patent.    Patented Dec. 21, 1920.

Application filed July 3, 1920. Serial No. 393,858.

*To all whom it may concern:*

Be it known that I, THOMAS E. MURRAY, a citizen of the United States, residing at Brooklyn, in the county of Kings and State of New York, have invented a certain new and useful Improvement in Methods of Electrically Welding Together the Edges of Thin Metal Plates, of which the following is a specification.

The invention is a method of electrically welding together the edges of thin metal plates, the object being to prevent relative displacement of said edges during the welding operation.

In the accompanying drawing—

Figure 1 is a section of two thin plates with strips welded thereto at their edges. Fig. 2 is a top view of the same. Fig. 3 is a section of two similar plates with their edges bent back and welded to the bodies of said plates. Fig. 4 is an elevation of a barrel or can, showing the welded joint between the parts thereof. Fig. 5 is an enlarged section of the edge portion of one of said parts.

Similar letters of reference indicate like parts.

To weld together electrically the edges of two thin plates—say, for illustration, of one quarter inch in thickness—is a difficult matter, and especially so when said edges are long—as, for example, in the case of a barrel or can for containing several gallons of oil. It is difficult to hold the parts to be welded in accurate registry in the welding machine, and even if this be accomplished, the passage of the alternating welding current causes a certain lateral vibration of the plates which throws them out of registry, so that the resulting joint may be much thinner than the plates themselves and, therefore, weaker. I have made many experiments in the effort to overcome this difficulty, and as a result thereof have reached the herein set forth simple solution of the problem.

I weld electrically upon each plate A and B, Figs. 1 and 2, a flat strip of metal C and D, so that the edge face of the strip shall be flush with the edge of the plate to which it is attached. I then place the edge faces of strips and plates in registering contact and weld them together. The thickness of the faces then amply allows for any possible displacement, as above described, so that the thickness of the welded joint is never less than the thickness of the plates themselves, while in addition said strips act to reinforce and strengthen said joint. Instead of making the added strips separately and welding them to the plates, as described, I may obtain a sufficient thickness at the edge faces by bending over the edge portions E, F of the plates themselves flat upon said plates and welding said edge portions to the bodies of said plates, as shown in Fig. 3. The edge faces G, H of the bent over portions are then welded together.

Where a barrel or large can, as shown in Fig. 4, is to be made, the same is made in two sections I, J and the edges thickened in either of the ways described. Where the vessel tapers from its middle to its ends, it is preferable to form the edge portions cylindrical, as shown at K, Fig. 5, and either unite to said portion the strips C, D in ring form, or bend over the same, as shown in Fig. 3.

I claim:

1. The method of electrically welding together the edges of thin metal plates, which consists in first electrically welding to the edge portions of each plate a strip of metal having its outer edge flush with the edge of said plate, and then electrically welding together the edge faces of the opposing plates and strips.

2. The method of electrically welding together the edges of thin metal plates, as in claim 1, including the further step of first producing said strip by bending over the edges of said plates.

In testimony whereof I have affixed my signature in presence of two witnesses.

THOMAS E. MURRAY.

Witnesses:
  GERTRUDE T. PORTER,
  MAY T. McGARRY.